United States Patent [19]
Hennessy et al.

[11] Patent Number: 6,014,117
[45] Date of Patent: Jan. 11, 2000

[54] AMBIENT VISION DISPLAY APPARATUS AND METHOD

[75] Inventors: Robert T. Hennessy, Pebble Beach; Thomas J. Sharkey, Newark, both of Calif.

[73] Assignee: Monterey Technologies, Inc., Monterey, Calif.

[21] Appl. No.: 08/956,330

[22] Filed: Oct. 23, 1997

Related U.S. Application Data

[60] Provisional application No. 60/051,826, Jul. 3, 1997.

[51] Int. Cl.$^7$ ...................................................... G09G 5/00
[52] U.S. Cl. ..................... 345/8; 345/7; 345/9; 340/980; 359/630
[58] Field of Search ........................ 345/1, 7–9; 340/967, 340/974, 977, 980; 359/630

[56] References Cited

U.S. PATENT DOCUMENTS 5,072,218  12/1991  Spero et al. ............................. 340/980

OTHER PUBLICATIONS

Hosman, R.J.A.W. & J. C. van der Vaart. "Accuracy of Visually Perceived Roll Angle and Roll Rate Using an Artificial Horizon and Peripheral Displays." Delft University of Technology, Dept. of Aerospace Engineering, Report LR–377. 1983. pp. 1–23.

Hosman, R.J.A.W. & J. C. van der Vaart. "Perception of Roll Rate from an Artifricial Horizon and Peripheral Displays." Delft University of Technology, Dept. of Aerospace Engineering, Report LR–403. 1983. pp. 1–23.

Flach, John M., Brent A. Hagen. & John F. Larish. "Active Regulation of Altitude as a Function of Optical Texture." Perception & Psychophysics. 1992. pp. 557–568.

Money, K. E. "Theory Underlying the Peripheral Vision Horizon Device." DCIEM Technical Communication, 82–C–57. 1982. pp. 1–11.

Money. K. E., R. E. Malcolm & P.J. Anderson. "The Malcolm Horizon." Agard Conference Proceedings No. 201. 1976. pp. 1–3.

Majendie, A.M.A. "The Para–Visual Director." The Journal of the Institute of Navigation, vol. 13. 1960. pp. 447–454.

*Primary Examiner*—Richard A. Hjerpe
*Assistant Examiner*—Henry N. Tran
*Attorney, Agent, or Firm*—LaRiviere, Grubman & Payne, LLP

[57] ABSTRACT

A display system conveys vehicle guidance information in the peripheral field of view of the user by the movement of ambient symbology that is not representational of either symbols or physical objects, and does not require any optics for the purpose of representing the display within the focal range of the eye. The ambient symbology is presented outside the central 30 degrees of the forward field of view of the user, and appeals to the ambient or peripheral mode of processing visual information, in contrast to previous displays which have been designed for focal modes of visual processing.

42 Claims, 5 Drawing Sheets

AMBIENT VISION DISPLAY APPARATUS AND METHOD

RELATED APPLICATION DATA

This application claims the benefit of U.S. Provisional Patent Application No. 60/051,826 filed on Jul. 3, 1997.

The U.S. Government has a paid-up license in this invention and the right in limited circumstances to require the patent owner to license others on reasonable terms as provided for by the terms of Contract No. DAAJ02-97-C-0011 awarded by the Department of Defense.

TECHNICAL FIELD

The present invention relates to an apparatus for, and method of, presenting information on the motion and/or attitude of an object in an environment, to a user.

In particular, the object may be a vehicle, and the information provided is then indicative of the motion or attitude of the vehicle in its particular environment (land, air, sea or space). In such a case, the user may be in the vehicle, or may be piloting or evaluating the movement of the vehicle remotely. Alternatively, the environment may be a computer-generated virtual environment, and the information presented is then indicative of the motion and/or attitude of a computer generated object in the virtual environment.

BACKGROUND OF THE INVENTION

Vehicle control displays are either panel mounted or head mounted. Most displays are panel mounted displays (PMDs). That is, the display instrument is located on a panel in front of the operator. Head mounted displays (HMDs) are a new form of display coming into use. The unique characteristic of an HMD is that the display is attached to the head or helmet of an operator. Both PMDs and HMDs show letters, numbers, symbols, pictures and images to convey information for vehicle control to an operator. Conventional displays for land, air and sea vehicles are based on the assumption that the operator must and will direct central vision, i.e., fixate on the item or part of the display and "read" the information. For example, a driver looks at the numbers and pointer of the speedometer to see what an automobile speed is; an airplane pilot will fixate on the artificial horizon and airplane symbol to determine if the wings are level; a ship's helmsman will read the compass to check on the ship's heading.

The use of such displays and their associated symbology requires direct or almost direct fixation for legibility, and mental interpretation for meaning. This places a cognitive burden on the operator, and more importantly, when the operator is looking at the symbology, he or she is not looking for threats, obstacles or other features of the surroundings.

Conventional PMDs are viewed directly, usually at a distance of 24 or more inches from the operator. If they are too close to the eyes, it causes strain to have to focus at a near distance for prolonged periods. The symbols or pictures on an HMD always rely on an optical system to create the symbols and pictures at a distance the eye can focus on. Usually, this distance is optical infinity or very close to it; that is, everything is presented as if it were being seen from a great distance. If this were not done, the symbols and pictures would be out of focus for the eye and not readable. Also, the information being displayed is generally within the central or 30 degrees of vision, since requiring eye movement outside the central or 30 degree vision rapidly creates eye strain.

In summary, current displays for vehicle guidance have been designed and built for central vision. They must be fixated and read to obtain information. They must therefore be located or imaged at a distance that allows them to be comfortably focused on by the eye. Also, they impose a significant cognitive load on the operator, which detracts from the ability of the operator to direct attention to other tasks associated with piloting of the vehicle.

Accordingly, it would be desirable to provide a display system which is more intuitive, and reduces the cognitive and visual demand on the vehicle operator.

SUMMARY OF THE INVENTION

According to the invention, there is provided a new type of display system conveying information about the movement or attitude of an object in a real or virtual environment.

The display requires neither fixation, nor that the displayed image be in focus. The display conveys movement or attitude information in the peripheral field of view by the movement of ambient symbology. An image including ambient symbology is defined to have areas of differing contrast and/or differing color and/or differing texture which are not representational of objects in the external environment, the movement of which can be detected in the peripheral field of view of an observer. Applying this definition, it will be noted that a single line of a single color does not possess the requisite area, or the requisite differing contrast or differing color, and thus does not fall within the definition. For the purposes of this specification, black and white shall be included in the term "color".

Typically, the ambient symbology comprises a number of arbitrary shaped objects, areas or a pattern defined by the differing contrast, differing color or differing texture, and does not require any optics for the purpose of representing the display within the focal range of the eye. The ambient symbology is preferably sufficiently large to present an area of sufficient size and contrast that the movement of the ambient symbology may be detected regardless of the direction the eyes are pointing. Information about the movement of the object along longitudinal, lateral and vertical axes and rotation about the same axes, is represented by the movement of the ambient symbology. The movement of the ambient symbology need not, but may be identical or similar to the perceived movement of objects external to the user. The display may either be fixed, or be a head mounted display, the latter being the preferred embodiment.

The preferred ambient symbology relies on areas or objects of differing contrast, as differing contrast per se provides stronger ambient or peripheral stimulation than areas or objects of different color or texture per se.

The display system of the invention appeals to the ambient mode of processing visual information, in contrast to previous displays which have been designed for focal modes of visual processing. The focal mode of visual processing is a "what" system that is directed by attention, and serves detail resolution, object detection, recognition, identification and alignment. In contrast, the ambient mode is a "where" system that serves spatial awareness, self-orientation, self-motion and gaze stability. Superficially, the distinction appears to be the anatomical peripheral-foveal receptor difference, but the dissimilarity is more profound.

The two visual systems differ physiologically and functionally in several ways. The ambient system is more primitive in evolution and has neural connections to the vestibular and somato-sensory systems and receives input from the whole retina. The ambient system works at a reflexive level, neither requiring attention, nor easily overcome by conscious volition. Functionally, the ambient system operates by the principle of mass action; the greater area of the retina stimulated, the greater and faster the response. Also, ambient function is not much affected by luminance level, and is not spatially frequency dependent (i.e., is not dependent on fine detail for information). The ambient system operates without increment down to near the absolute threshold for light detection and is insensitive to optical blur. The ambient system is gross, but robust. It operates independent of gaze, gaze direction and does not impose a cognitive load.

In contrast, the focal system is a more recent development in evolution. It has input from the central portion of the retina only and neurologically it is confined to the geniculo-corticate primary pathway. Functionally, the focal system is controlled by attention, is highly directional, has great resolving power under optimal conditions and is primarily responsible for object detection and recognition. However, good performance requires adequate luminance, good optical focus, fixation accuracy and stability of gaze. Focal system performance is easily disrupted by darkness, obscurants, vibration and blurring of the foveal image.

By taking the focal-ambient system distinction into account, the invention takes advantages of the different strengths of the two systems. The operator workload is reduced because attitude and movement information previously coded for focal symbology is now coded for ambient processing. This reduces the amount of focal symbology present, and hence, reduces clutter. Also, the ambient system works at the unconscious level, so there is a reduction, and not just a transfer, of cognitive workload. Operator reliability and safety is improved because the ambient information is available continuously and not during periodic, discrete intervals of fixation. Safety and reliability is also improved because of the fact that less time is required for looking at focal symbology, and more attention can be given to viewing the imagery of the surrounding environment.

The best mode display of the invention has the characteristics that the display surfaces (or the displayed images) are located preferably outside the central 60 degrees (i.e. 30 degrees from straight ahead), more preferably outside the central 50 degrees, more preferably outside the central 40 degrees, and most preferably outside the central 30 degrees of the forward field of view of the user, such that the display conveys guidance information in the peripheral field of view by the movement of ambient symbology that is not representational of either symbols or physical objects, and does not require any optics for the purpose of representing the display within the focal range of the eye. For example, a forward motion of a vehicle is conveyed by rearward streaming of the ambient symbology. Clockwise rotation of the vehicle or object about its longitudinal axis is conveyed by downward streaming of symbology on the display on the left, and upward streaming of the symbology on the display on the right. Multiple types of movement can be conveyed simultaneously by combining the individual movement characteristics. Brightness and contrast need only be above the prevailing state of adaptation of the eye.

While optics may be used to present the ambient symbology within the focal range of the eye, this is not required. The fact that such optics can be omitted provides significant cost and weight advantages (especially important for HMD's), and reduces complexity and data processing requirements. In a case where optics are used, they may function to increase the ambient symbology total display area as perceived by the user.

More specifically, according to the invention there is provided a method of presenting information on the motion or attitude of an object in an environment, to a user, by means of the motion of an image comprising ambient symbology, the method comprising the steps of:

providing an image display means for displaying an image to the user outside the central 30 degrees of the field of view of the user;

providing data processing means for manipulating image data;

providing ambient symbology image data, the ambient symbology image data being representative of an image including ambient symbology;

capturing a selected one of a motion parameter of the object and an orientation parameter of the object, the motion parameter being related to the motion of the object in the environment and the orientation parameter being related to the orientation of the object in the environment;

processing the ambient symbology image data in the processing means using the selected one of the motion parameter and the orientation parameter and a drive function, to provide motion of the image;

providing the ambient symbology image data to display means, such that a moving image including the ambient symbology is displayed by the display means outside the central 30 degrees of the field of view of the user, the motion of the image including the ambient symbology being based on the selected one of the motion parameter and the orientation parameter.

Also according to the invention there is provided an apparatus for presenting information on the motion or attitude of an object in an environment, to a user, by means of the motion of an image comprising ambient symbology, comprising:

means for obtaining a selected one of a motion parameter of the object and an orientation parameter of the object, the motion parameter being related to the motion of the object in the environment and the orientation parameter being related to the orientation of the object in the environment;

data processing means for manipulating ambient symbology image data, the ambient symbology image data being representative of an image including ambient symbology, the data processing means in use processing the ambient symbology image data using the selected one of the motion parameter and the orientation parameter and a drive function, to provide motion of the image; and image display means for receiving the ambient symbology image data and for displaying an image to the user outside the central 30 degrees of the field of view of the user; the motion of the image in use being based on the selected one of the motion parameter and the orientation parameter.

Further according to the invention there is provided a method of presenting information on the motion or attitude of an object in an environment, to a user, by means of the motion of an image comprising ambient symbology, the method comprising the steps of:

a) providing image data which defines an image including ambient symbology;

b) obtaining a selected one of a motion parameter of the object and an orientation parameter of the object, the motion parameter being related to the motion of the object in the environment and the orientation parameter being related to the orientation of the object in the environment;

c) processing the image data using the selected one of the motion parameter and the orientation parameter and a drive function, thereby to generate updated image data based on the selected one of the parameters;

d) providing the updated image data to display means, such that an image comprising the ambient symbology is displayed by the display means outside the central 30 degrees of the field of view of the user; and e) executing steps b) to d) repeatedly, thereby to provide motion of the image comprising the ambient symbology, the motion being based on the selected one of the motion parameter and the orientation parameter.

Also according to the invention there is provided a program storage device readable by a machine, tangibly embodying a program of instructions executable by the machine to perform method steps for presenting information on the motion or attitude of an object in an environment, to a user, by means of motion of an image comprising ambient symbology, the machine including data processing means for manipulating image data and image display means for displaying an image to the user outside the central 30 degrees of the field of view of the user, the method comprising the steps of:

a) capturing a selected one of a motion parameter of the object and an orientation parameter of the object, the motion parameter being related to the motion of the object in the environment and the orientation parameter being related to the orientation of the object in the environment;

b) processing ambient symbology image data in the processing means using the selected one of the motion parameter and the orientation parameter and a drive function, to provide motion of the image;

c) providing the ambient symbology image data to display means, such that a moving image including ambient symbology is displayed by the display means outside the central 30 degrees of the field of view of the user, the motion of the image including the ambient symbology being based on the selected one of the motion parameter and the orientation parameter.

Further according to the invention there is provided a computer program product comprising:

a computer usable medium having computer readable program code means for presenting information on the motion or attitude of an object in an environment, to a user, by means of motion of an image comprising ambient symbology, the computer readable program code means being executable by a computer including data processing means for manipulating image data and image display means for displaying an image to the user outside the central 30 degrees of the field of view of the user, the computer program product having:

computer readable program code means for capturing a selected one of a motion parameter of the object and an orientation parameter of the object, the motion parameter being related to the motion of the object in the environment and the orientation parameter being related to the orientation of the object in the environment;

computer readable program code means for processing ambient symbology image data in the processing means using the selected one of the motion parameter and the orientation parameter and a drive function, to provide motion of the image;

computer readable program code means for providing the ambient symbology image data to display means, such that a moving image including ambient symbology is displayed by the display means outside the central 30 degrees of the field of view of the user, the motion of the image including the ambient symbology being based on the selected one of the motion parameter and the orientation parameter.

Other features of the invention are disclosed or apparent in the section entitled "BEST MODE OF CARRYING OUT THE INVENTION"

BRIEF DESCRIPTION OF THE DRAWINGS

For fuller understanding of the present invention, reference is made to the accompanying drawings in the following detailed description of the Best Mode of Carrying Out the Invention. In the drawings.

BEST MODE OF CARRYING OUT THE INVENTION

As are well known in the art, in order to avoid confusion, while enabling those skilled in the art to practice the claimed invention, this specification omits many details with respect to known items.

Figure 1:
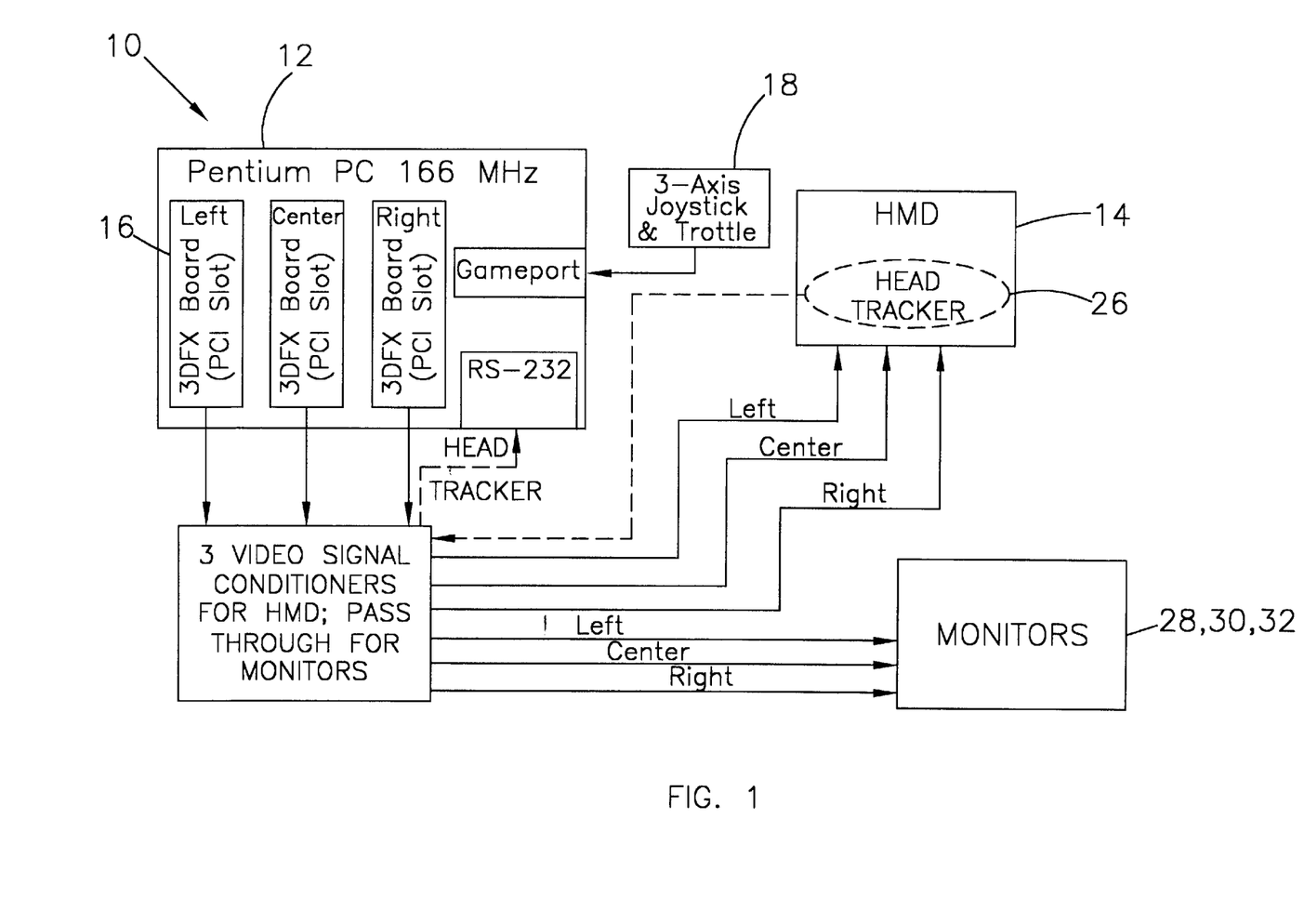
FIG. 1 is a schematic view of the best mode of an ambient symbology display system for presenting information on the movement and attitude of an object in a virtual environment.

A first embodiment of a display system according to the invention is shown in schematic form in FIG. 1. In this embodiment, the environment to which the display relates is a computer generated, "virtual" environment. While the Applicants believe that the primary use of the invention will be in an aircraft or vehicle in the real world, the invention also finds useful application in the computer generated environments found in flight simulators and computer games. In the display system described below with reference to FIG. 1, the operation of a helicopter is simulated, and the simulated helicopter is thus the object mentioned in the Technical Field section above. It should be noted however that the invention is also useful to provide information on self motion of an operator in an virtual environment, and in such a case, the operator is the "object".

Referring to FIG. 1, the ambient symbology display system, generally indicated by the numeral 10, comprises data processing means in the form of a personal computer 12 and display means in the form of a head mounted display 14.

The personal computer 12 is a 166 MHz Pentium Computer running under the Microsoft Windows 95 operating system. The personal computer 12 is unmodified, but, in addition to a standard game port and a RS-232 port, it has three 32 bit PCI expansion slots available for the necessary graphics processing boards. Installed in each of the three PCI expansion slots of the personal computer 12 is a 3DFX Obsidian graphics processing board 16. One of these graphics board 16 is provided for each channel of the imagery presented to the user of the system 10. As will be described in more detail below, one graphics board 16 presents an "out of the window" scene, while the other two graphics boards present ambient symbology according to the invention in display fields to the left and right of the operator.

Control input is provided to the personal computer 12 by means of a 3-axis joystick 18 which includes a throttle control. The joystick 18 is a Sidewinder 3-D Pro joystick made by Microsoft Corporation. Longitudinal and lateral displacement of the joystick 18 provides an input to the simulated helicopter's cyclic. Rudder control is effected by twisting the joystick 18. Clockwise twisting rotation of the joystick 18 has the same effect as pressing the right rudder pedal of a conventional helicopter, while counter-clockwise twisting rotation has the same effect as pressing the left rudder pedal of a conventional helicopter. Input to the collective control of the simulated helicopter is provided by means of the throttle control of the joystick 18, which takes the form of a sliding lever mounted on the base of the joystick 18. Pushing the lever forward increases the power delivered to the rotor and vice versa.

Figure 2:
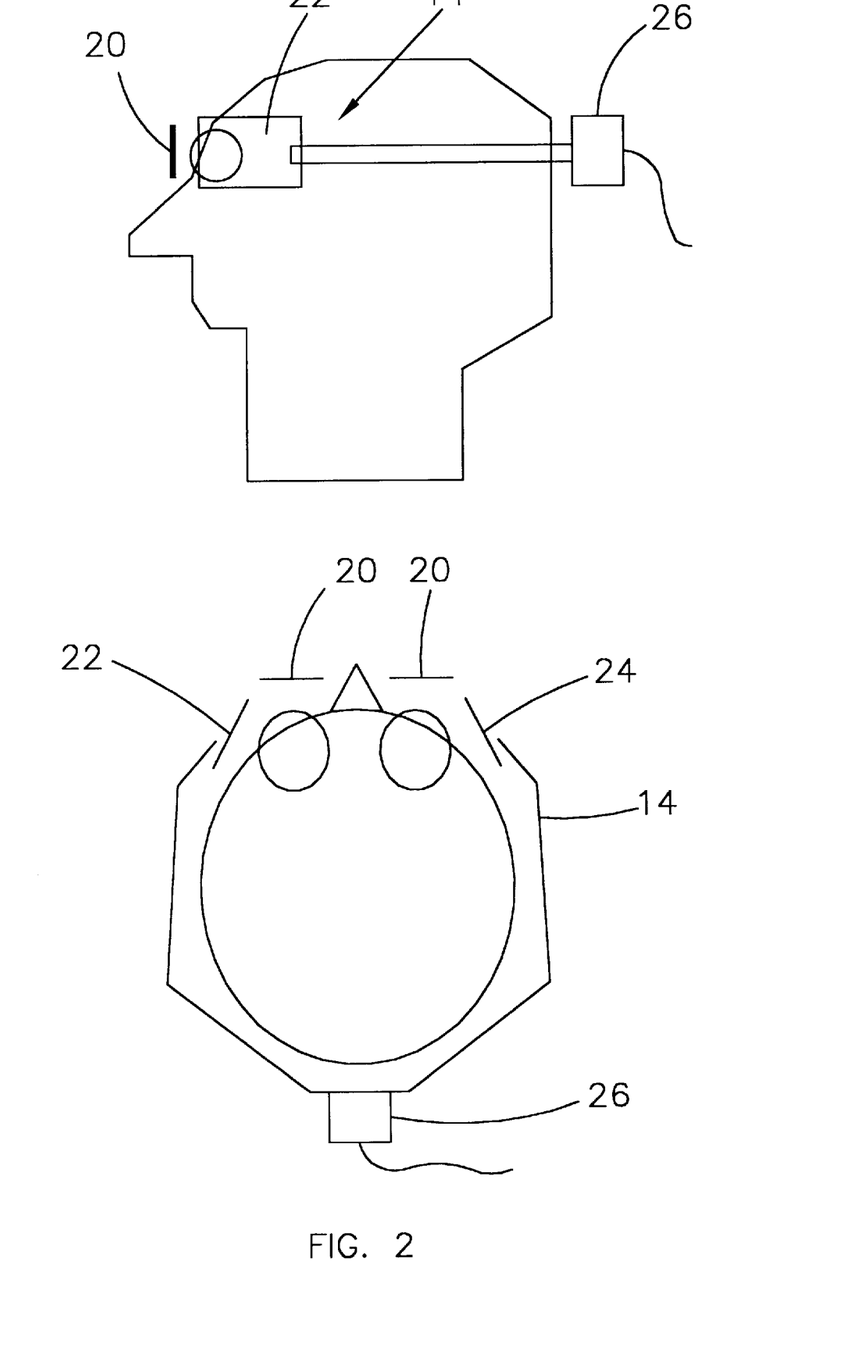
FIG. 2 shows a side and top view of a head mounted display for use in the system of FIG. 1.

The head mounted display (HMD) 14, shown schematically in FIG. 2, is constructed from commercial, off-the-shelf items. Three pairs of I-Glasses (Virtual I/O, Seattle Wash.) are used to make a single HMD 14. The "out of the window" scene was presented biocularly through the display surfaces 20 of an essentially unmodified pair of the I-Glasses. A left peripheral display 22 is provided using one of the single liquid crystal display (LCD) modules, including a backlight panel, and the circuit board from one of the remaining pairs of I-Glasses. A right peripheral display 24 is provided in a similar fashion from the LCD module and circuit board from the remaining pair of I-Glasses. Preferably, the LCD modules have a resolution of at least 300 by 200 pixels, and more preferably, the LCD modules have at least VGA resolution (640 by 480 pixels).

Figure 3:
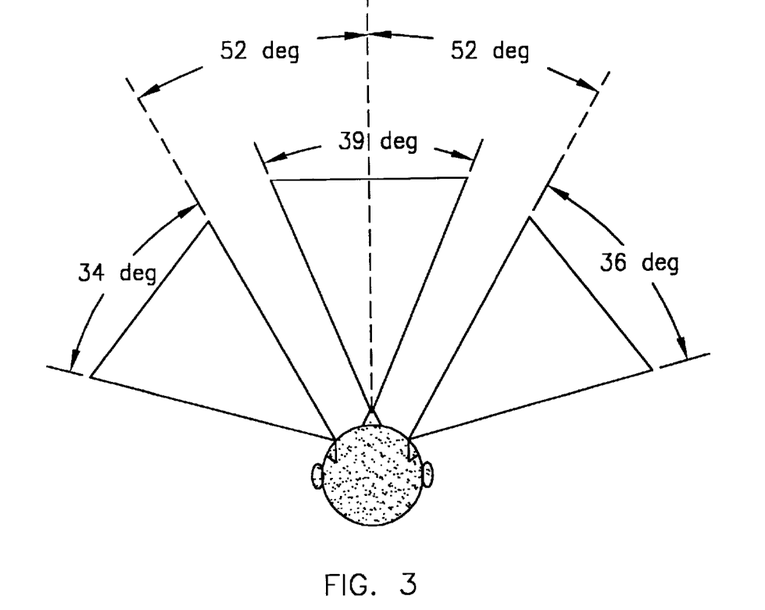
FIG. 3 shows the horizontal fields of view presented by the display surfaces of the head mounted display shown in FIG. 2.

The display surfaces 20, 22 and 24 are arranged top provide the fields of view shown in FIG. 3. As can be seen from the figure, the "out of the window" display surfaces 20 subtend a horizontal angle of 39°, as well as a vertical angle of 28°, the left display surface 22 subtends a horizontal angle of 34°, as well as a vertical angle of 19°, and the right display surface 24 subtend a horizontal angle of 36°, as well as a vertical angle of 20°.

Included in the HMD 14 is an optional head tracking system 26. The head tracking system 26 is a 3-axis, commercial, off-the-shelf head tracking system which is bundled with the PC version of the I-Glasses. Pitch, roll and yaw of the operator's head is sensed by the head tracking assembly, and representative signals are transmitted via the RS-232 communications interface to the computer 12. These head tracking signals are processed by the computer 12 to stabilize the images presented to the user by the display surfaces 20,22 and 24 as the operator's head is moved.

Figure 4:
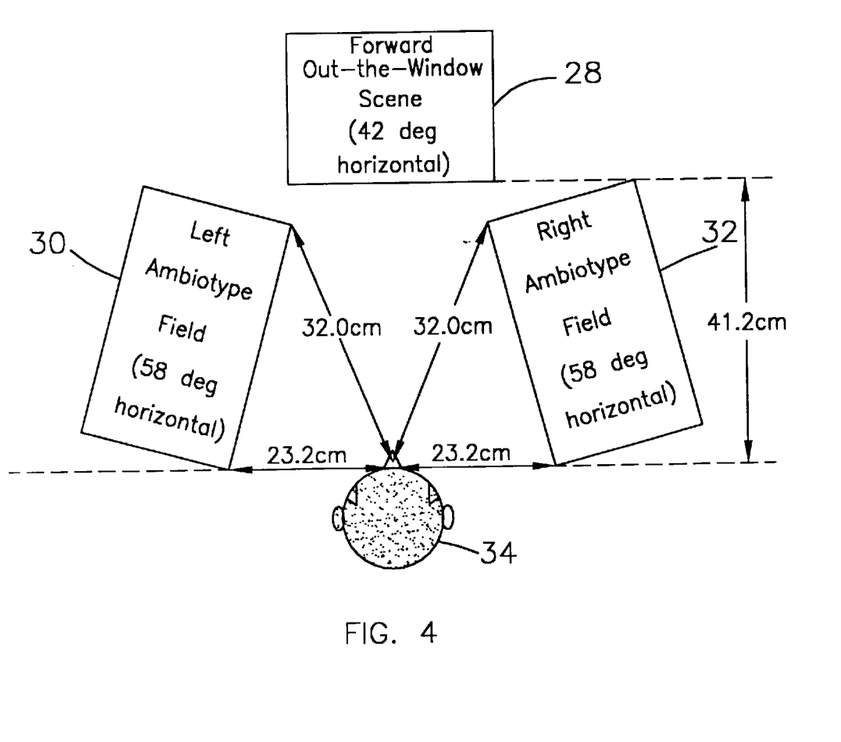
FIG. 4 shows the locations and horizontal fields of view presented by the optional monitors used in the system of FIG. 1.

As an alternative to the HMD 14, the display means may be in the form of three monitors 28, 30, 32 arranged around the operator 34 as shown in FIG. 4. In this configuration, the front "out of the window" view is represented on the front monitor 28, while the left and right ambient symbology according to the invention is presented in the left and right monitors 30, 32 respectively. Because, as discussed above in the Summary of the Invention, the ambient visual functions are relatively insensitive to optical focus, but are sensitive to the amount (area) of the retina stimulated, the peripheral monitors 30, 32 are placed as close as practicable to the operator thereby to maximize the angles subtended by the monitors 30, 32. The front monitor 28 is placed at a distance which allows the operator to see the image displayed thereon clearly with essentially normal visual accommodative effort. The configurations of the monitors and there horizontal extents are shown in FIG. 4. To summarize, the display surface of the monitor 28 subtends a horizontal angle of 42° and a vertical angle of 29°, the display surface of the left and right peripheral monitors 30 each subtend a horizontal angle of 58°. The vertical extents of the left and right peripheral monitors 28, 30 ranged from 41° at the edge closest to the operator 34, to 32° at the edge furthest from the operator 34. The front monitor has a 17" diagonal display size while the peripheral monitors 30, 32 have a 15" diagonal display size. A chin rest is provided so that the operator's head is positioned to observe the display surfaces, and to minimize head movement Helicopter aerodynamic and control simulation software is used to provide a context for the operation of the invention. While any of a number of commercially available helicopter simulation programs could be used with the invention, the helicopter simulation uses the TMAN software model. TMAN contains generic helicopter control, aerodynamic and propulsion modules, and was made available to the Applicants courtesy of the NASA Ames Research Center. The TMAN software, which was originally supplied to the Applicants in the C language, was translated into C++language for compatibility with the graphics software.

The graphics control software used to provide the graphical output is the RealiMation software package developed by Datapath Ltd. (UK). RealiMation is an applications program interface (API) that provides convenient means to generate and manipulate different scenes for each of the three visual display channels, and to integrate the helicopter simulation model into a terrain database which serves as the virtual environment. In particular, the translation or rotation of an image on a display can easily be accomplished using this software, by means of simple commands operating on data provided by and captured from the TMAN software model. The terrain database which is used is a generic terrain database supplied as part of the RealiMation software package, and includes mountainous and rolling terrain, as well as natural features such as rivers and cultural features such as buildings and roads.

The image provided on the display surfaces 20 of the HMD or the monitor 28 comprises an "out of the window" view of the terrain, together with an opaque cockpit outline, and focal symbology. The focal symbology may be any conventional focal symbology such as a pitch ladder, an artificial horizon etc., and is not part of the invention per se. In a real environment, the focal symbology may be nothing more than the normal instrumentation presented in the cockpit of the aircraft or vehicle.

In the illustrated ambient symbology display system 10, the focal symbology is limited to an artificial horizon with numerical indicators for airspeed, heading and altitude of the simulated helicopter. The provision of a virtual flight environment including "out of the window" views and focal symbology is well known in the simulation arts, and software packages providing these features are available as off the shelf items. Therefore, these features will not be dealt with further here.

Figure 5:
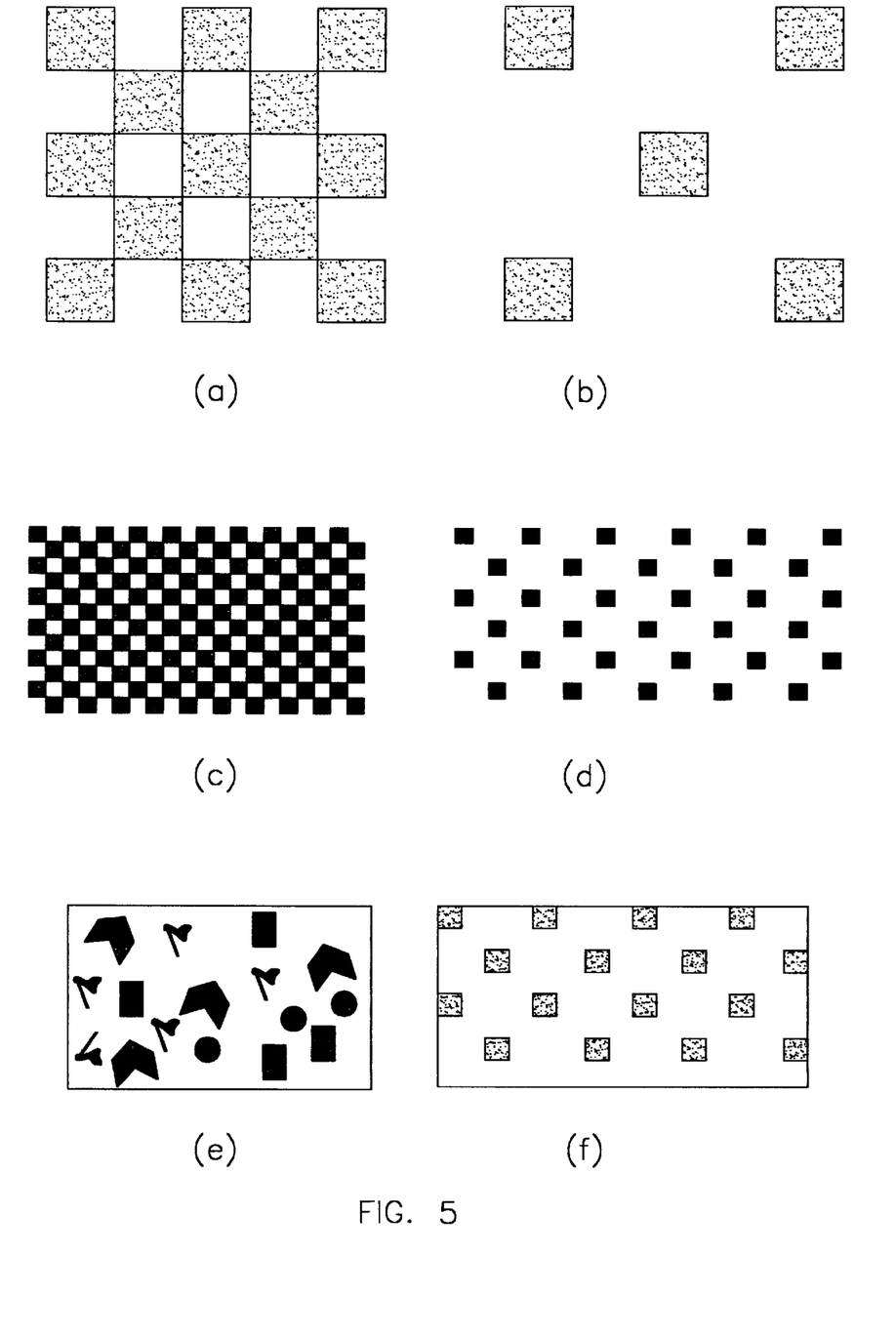
FIG. 5 shows examples of different types of ambient symbology for use in the invention.

The images provided on the display surfaces 22, 24 of the HMD or the monitors 30, 32 comprise the ambient symbology of the invention. Examples of the ambient symbology of the invention are shown in FIG. 5. In FIG. 5(a), a checkerboard pattern of large square blocks in a high density pattern is shown. In FIG. 5(b), the blocks are again large, but the density of the blocks is low. The symbology presented in FIG. 5(c) has a small block size with a high block density, while the symbology presented in FIG. 5(d) has a small block size and a low block density. The arrangement of the ambient symbology may also have an irregular format, with irregular shapes or areas and spacing as shown in FIG. 5(e), but the preferred arrangement of the ambient symbology is a regular arrangement as shown in FIG. 5(f)

It will also be appreciated that it is not necessary to provide finely delineated distinct objects such as the squares or rectangles. Areas of differing contrast, color or texture may be sufficient to provide the required gross visual input to the eye. Also, the ambient symbology may be opaque or partially transparent.

Since the ambient mode of visual processing does not degrade with decreasing luminance, the ambient symbology can be at a much lower level of intensity than the focal symbology, as long as it is above the prevailing state of adaptation of the eye.

While it is apparent that the characteristics of the ambient symbology may be varied, the ambient symbology retains the basic characteristics that the symbology presented comprises arbitrary shapes that are intended to stimulate a relatively large area of the retina without presenting information that the operator has to focus and concentrate (i.e. fixate) on to absorb. That is, the ambient symbology is not a symbol in the conventional (focal) sense of the word, but rather conveys information by flow and movement, to mimic in some way the flow of the natural optic array in the environment which is presented to the operator.

Of the various ambient symbologies shown in FIG. 5, the high density, large size arrangement shown in FIG. 5(a) is believed to be the best mode of the ambient symbology according to the invention. Larger areas of contrast are less sensitive to the degradation that occurs because the image is not in focus, and a larger number of areas of contrast provide a greater bulk input to the operator's ambient system.

In the best mode, the symbology in FIG. 5(a) is presented to the operator such that the total display area for each of the displays 22,24,30,32 subtends an angular area with respect to the eye of at least 600 square degrees, and each of the displayed objects or areas (i.e. each square in FIG. 5(a)) subtends a minimum of 400 square minutes.

Once the particular ambient symbology has been defined, information about the attitude and motion of the simulated helicopter in the virtual environment is conveyed to the operator by movement of the displayed ambient symbology. In the best mode of the invention, with the operator's head facing towards the nose of the helicopter along the roll axis of the helicopter, forward movement of the helicopter is portrayed by rearward streaming of the ambient symbology along the roll axis, rearward movement of the helicopter is portrayed by forward streaming of the ambient symbology along the roll axis, an increase in altitude of the helicopter is portrayed by downward streaming of the ambient symbology, and a decrease in altitude is portrayed by upward streaming of the ambient symbology.

As far as rotations or change in attitude of the helicopter are concerned, clockwise roll of the helicopter about its roll axis is portrayed by downward streaming of the ambient symbology on the left display and upward streaming of the ambient symbology on the right display, and vice versa. Similarly, clockwise yaw of the helicopter (when viewed from above) is portrayed by rearward streaming of the ambient symbology on the left display and forward streaming of the ambient symbology on the right display, and vice versa. Upward pitching of the nose of the helicopter is portrayed by counterclockwise rotation of the symbology on both the left and right displays and downward pitching of the nose of the helicopter is portrayed by clockwise rotation of the symbology on both the left and right displays, when viewing the operator from the left side.

Stated more generally, with left and right displays, roll of the helicopter is portrayed by differential translation of the ambient symbology in the two displays along the yaw axis, pitch is portrayed by rotation of the ambient symbology about the pitch axis, and yaw is portrayed by differential translation of the ambient symbology in the two displays along the roll axis of the helicopter.

Multiple types of movement are conveyed simultaneously by combining the individual movement characteristics.

In its simplest form, and in the described best mode, the drive laws which govern the movements of the ambient symbology are linear, and they are based on absolute values of the particular parameter relative to the real or virtual environment. For example, for forward motion of the helicopter in the virtual environment, the symbology is motionless when the air or ground speed of the helicopter is zero, and the speed of the rearward streaming of the ambient symbology increases linearly as the forward air or ground speed of the helicopter increases.

In the embodiment illustrated in FIGS. 1 to 5 the movement of the ambient symbology with respect to rotations of the helicopter about the yaw, pitch and roll axes is consistent with the actual angle of rotation. That is, if the helicopter pitches back by 10°, the ambient symbology pitches forward by 10°. If the helicopter rolls through 10°, the ambient symbology moves up through an observed arc of 10° on the one side, and down through an observed arc of 10° on the other side. That is, the drive laws define a one to one relationship between rotation of the helicopter and rotations/translation of the ambient symbology.

In the embodiment illustrated in FIGS. 1 to 5, the relationship (i.e. the drive law) between the forward velocity of the helicopter and the rearward movement of the ambient symbology is as follows: The ambient symbology moves through a perceived arc of 0.25° per second on the LCD panel per mile per hour. The relationship between change in altitude and the upward or downward movement of the ambient symbology is as follows: The ambient symbology moves through a perceived arc of 2.5° per second on the LCD panel per mile per hour. That is, the drive laws are linear for translations of the helicopter.

The drive laws may be varied in a number of different ways. For example, instead of being linear, the relationship between the parameter in question and the movement of the ambient symbology may be exponential, logarithmic or asymptotic. Also, the zero point of the ambient symbology movement may be varied. For example, the movement of the ambient symbology may be based on a difference between a desired motion or attitude and an actual motion or attitude. For example, the ambient symbology may be stationary when the helicopter is at a cruise speed, streaming rearward when the helicopter is exceeding a cruise speed, and streaming forward when the helicopter is falling behind. Also, the drive law may be based on a relative value. For example, in a motor vehicle, the movement of the ambient symbology may be based on a rate of closure (i.e. a relative velocity) between two vehicles, to provide a collision warning.

A number of factors might determine which of the drive laws is utilized under any particular circumstance. For example, different drive laws may be useful, and the system may automatically switch between different drive laws, when the helicopter is fulfilling different roles or is operating in different modes e.g. reconnaissance vs. attack. Also, the Applicants have determined that it is appropriate to vary the drive laws to ensure that all the different motions are detectable. For example, using a linear and absolute value based drive law, yaw cueing performance is poor when the helicopter is operating at cruise speeds, but is quite good when the helicopter is moving at a low speed. As described above, yaw cueing is provided by differential movement of the ambient symbology in the left and right displays. At zero speed, the symbology moves in different directions as the helicopter yaws. At forward speeds, yaw cueing is provided as a differential between the speed of the left and right ambient symbologies. At some forward speeds, even maximum yaw rate does not provide enough differential ambient symbology motion to reach a noticeable level. Accordingly, it is important to provide drive laws which allow important information to be above threshold throughout the helicopter's operational envelope. In this example, one method of providing noticeable yaw cueing would be to use a drive law for the forward motion which provides ambient symbology motion based on a difference from the desired or optimal cruise speed of the helicopter.

Another possibility for use of the ambient symbology of the invention is to provide the operator with command information. For example, the ambient symbology could be used in conjunction with an obstacle detection system to cue the pilot to climb by upward streaming of the ambient symbology. Also, the operator could be cued, by downward streaming of the ambient symbology, to descend to reduce exposure of a military helicopter to detection or hostile fire.

While the checkerboard pattern is preferred because of its compelling nature, it should be noted that there is a problem with this pattern which needs to be taken into account when designing an ambient symbology display system. A repetitive pattern will provide ambiguous information at some combinations of helicopter motion. "Strobing", where the checks move approximately one half of their height or width in one frame, produces a situation where it is not clear whether the ambient symbology is indicating that the helicopter is ascending or descending. This situation is very similar to the effect that occurs when watching a film of a spoked wheel or airplane propeller, which at certain speeds appear or reverse their direction of rotation.

A first step in reducing this problem is to make the frame rate of the displays as fast as possible. Other solutions can be to increase the pitch between checks, increase the size of the checks, or a non-repetitive pattern can be used. These solutions can be employed in a temporary manner when the data processor detects that the movement of the ambient symbology is reaching an ambiguous level, or these techniques can be considered in the original definition of the ambient symbology display system to reduce or eliminate ambiguous situations.

Also, an upper threshold can be determined where there is no increase in the speed of movement of the ambient symbology for an increase in speed of the helicopter. The threshold would have to be set sufficiently close to an edge of the flight envelope of the helicopter so that under most conditions the threshold would not be reached.

As will be appreciated from the presence of the head tracker 26 in the ambient symbology display system 10, the position of the operator's head is used as an input to the drive laws. When the operator's head moves, the ambient symbology should not be move with the head, i.e. the ambient symbology must not be head stabilized. Rather, the ambient symbology is world stabilized so that when the operator turns his or her had, the movement of the ambient symbology changes appropriately to be consistent with the optical flow pattern of the real or virtual "out of the window" view.

For example, when the helicopter is moving in a straight line along its longitudinal axis, and the operator is looking directly ahead along the line of travel, the ambient symbology presented on both display surfaces will be streaming rearward. Should the operator turn his or her head to look out of the window at right angles to the direction of flight, the movement of the ambient symbology should cease.

It should be noted that, while the provision of world stabilized visual output is preferred, it is optional, and the system will function quite adequately without such stabilization. In such a case, the operator would keep his or her head aligned with the front of the vehicle to get the best use of the system.

Compensating for the movement of an operator's head to provide a world stabilized visual output is well known in the computer graphics and HMD arts, and the establishment of such a feature is within the skill of an ordinary person in these arts. In many cases, such as in the RealiMation graphics control software used to provide the graphical output in the ambient symbology display system 10, the capability of head tracking and world stabilizing of a display are bundled with the software. For additional information on the provision of a world stabilized display, reference is made to U.S. Pat. No. 5,072,218 to Spero et al., the disclosure of which is incorporated herein as if specifically recited.

In operation of the ambient symbology display system 10, the operator puts the HMD 14 on his or her head, the personal computer 12 is booted up, and the TMAN and RealiMation programs started. The operator is now presented with a helicopter simulation gaming environment. Inputs to the simulated helicopter are provided by the joystick 18, and the movement of the simulated helicopter within the gaming environment is determined from the TMAN simulation model and the joystick 18 inputs. The personal computer provides a conventional out-of-the-window display to the operator on the display surfaces 20, based on the position and movement of the simulated helicopter and the outputs received from the head tracker 26.

While the processing of the of the helicopter simulation model is taking place, and while the out-of-the-window display is being generated and displayed, the RealiMation graphics processing software, functioning as data capture means, captures one or more parameters from the TMAN software which are related to the motion of the helicopter in the environment (e.g. horizontal velocity, altitude, north-south and east-west distances) and captures one or more parameters which are related to the orientation of the object in the environment (e.g. yaw, pitch and roll). Ambient symbology image data, which is representative of ambient symbology shown in FIG. 5, is processed by the RealiMation software in the personal computer, using the captured motion and orientation parameters and the drive laws, to provide motion of the ambient symbology. The processed image data is passed to the display surfaces 22 and 24, and the ambient symbology is displayed by the display means to the user. As discussed above, the orientation and motion of the ambient symbology is based on the motion parameters and the orientation parameters, and is presented outside the central 30 degrees of the field of view of a user.

Alternatively stated, the motion and attitude parameters are captured by the RealiMation software, the ambient symbology image data is processed using a least one of the parameters and a drive function, to generate updated image data based on the parameter(s). The updated image data is provided to the display surfaces 22, 24, to display the ambient symbology to the user; and the data capture, processing and display steps are executed repeated at a sufficiently high rate to provide motion of the ambient symbology.

The invention is also conveniently embodied in a program storage device (e.g. a CD-ROM or DVD disc, magnetic disc etc) which is readable by a machine, tangibly embodying a program of instructions executable by the ambient symbology system 10, to perform the method steps for presenting the ambient symbology as described above.

Also, the invention is conveniently embodied in a computer program product (e.g. a CD-ROM or DVD disc, magnetic disc etc) comprising a computer usable medium (e.g. a reflective or magnetizable medium) having computer readable program code means for presenting the ambient symbology as described above on an ambient symbology display system. The computer program product has:

- computer readable program code means for capturing a selected one of a motion parameter of the object and an orientation parameter of the object, the motion parameter being related to the motion of the object in the environment and the orientation parameter being related to the orientation of the object in the environment;
- computer readable program code means for processing ambient symbology image data in the processing means using the selected one of the motion parameter and the orientation parameter and a drive function, to provide motion of the image;
- computer readable program code means for providing the ambient symbology image data to display means, such that a moving image including ambient symbology is displayed by the display means outside the central 30 degrees of the field of view of the user, the motion of the image including the ambient symbology being based on the selected one of the motion parameter and the orientation parameter.

In the embodiments of the ambient symbology display system illustrated in FIGS. 1 to 6, the program code is the RealiMation software incorporating the drive laws, and which captures the parameters and provides the ambient symbology output.

Figure 6:
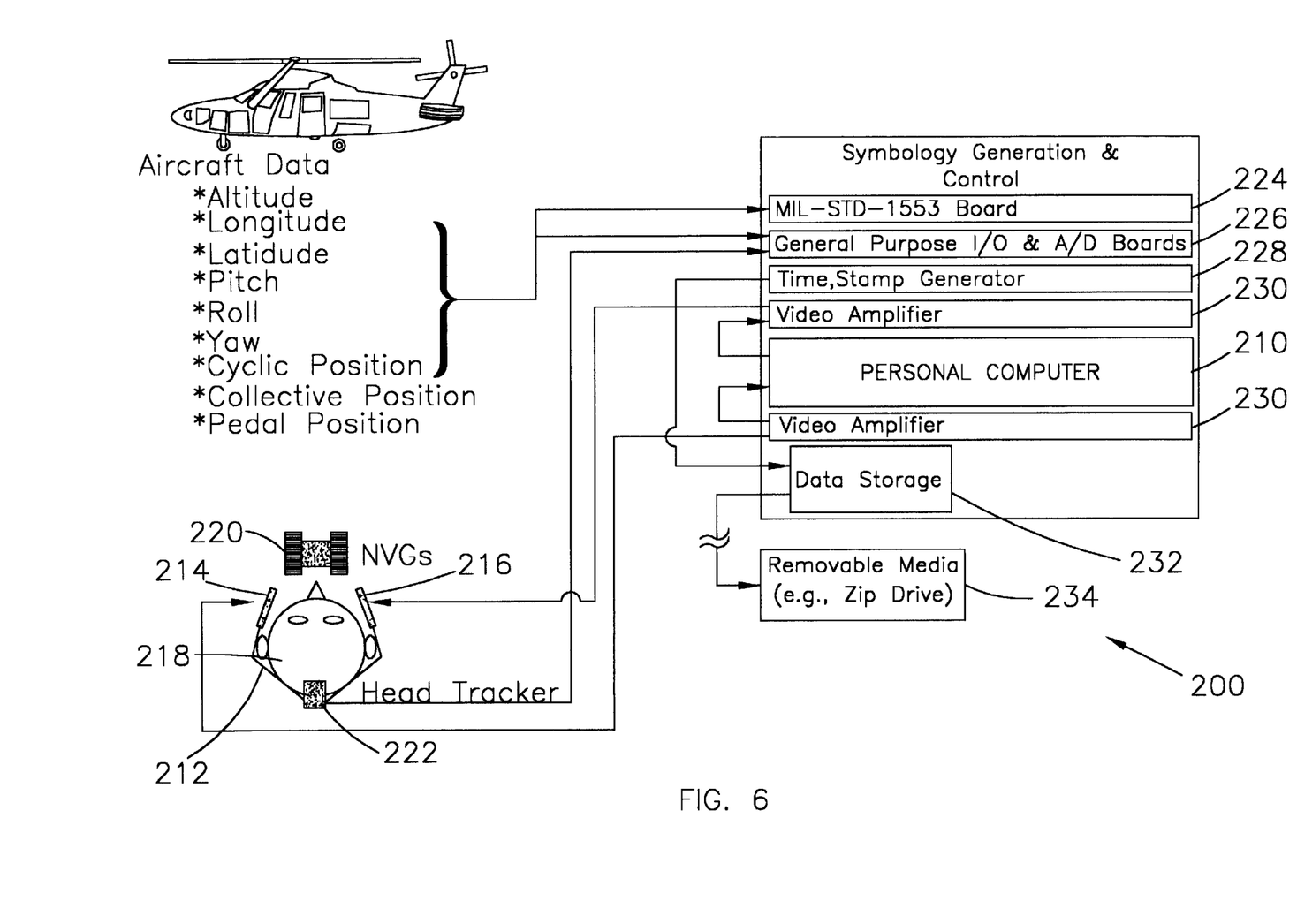
FIG. 6 is a schematic view of the best mode of an ambient symbology display system for presenting information on the movement and attitude of an object in a real environment.

The best mode embodiment of the invention for use in a real environment is shown schematically in FIG. 6. This embodiment of the invention shares many features with the best mode embodiment for use in a virtual environment, described above with reference to FIGS. 1 to 5. In particular, the discussions above of the different types of ambient symbology, the drive laws used to relate the motion and attitude of the virtual helicopter, the provision of a world stabilized environment, and the configuration of the personal computer 12, remain unchanged for the FIG. 6 embodiment of the invention, except as discussed below. The provision of the invention as a program storage device or as a computer program product as described with reference to FIGS. 1 to 5 also applies to the ambient symbology display system illustrated in FIG. 6. For purposes of conciseness, the discussion of such common features will not be repeated here.

The ambient symbology display system for use in a real aircraft, generally indicated in FIG. 6 with the numeral 200, comprises data processing means in the form of a personal computer 210 and display means in the form of a head mounted display 212.

The personal computer 210 is substantially identical to the personal computer 12 described above with reference to FIGS. 1 to 5, except that it is not required to provide a central channel representative of the virtual environment, it receives data as described below and not from a joystick, and the graphics boards 16 are upgraded to high end Obsidian graphics boards.

As far as the software used to provide the ambient symbology is concerned, it is no longer necessary to model the behavior of a helicopter in a virtual environment, since the helicopter performance data is available directly from the helicopter's data bus, as will be described below. Accordingly, the TMAN software is no longer required to generate helicopter performance parameters, and the RealiMation graphics software generates the ambient symbology and its movement directly from data captured from the helicopter databus.

The HMD 212 is a modified ProView HMD (Kaiser Electro-Optics), to which is mounted left and right LCD panels 214 and 216 respectively. The LCD panels have a resolution of 640 by 480 pixels, and subtend the same angles as the LCD panels 22 and 24, as discussed above with reference to FIG. 3.

Optionally, the system 200 may be provided with a means for providing central field of view, focal mode information to the pilot 218, in this case, night vision goggles 220.

The position of the pilot's head is used as an input to the system 200 as before, and this is done by means of a head tracker 222. The head tracking function of the system 200 is either accomplished by a Polhemus head tracking system, or by the Integrated Helmet and Display Sighting System (IHADSS) currently found on the AH-64 Apache helicopter.

The helicopter's flight parameters (attitude, longitude, latitude, pitch, roll and yaw) which are needed to drive the ambient symbology are captured in use from the helicopter's databus by a MIL-STD-1553 board 224. The MIL-STD-1553 board 224 is also used to capture dependent parameters which are available from the helicopter's databus, such as the helicopter cyclic position, collective position, and the rudder pedal position. The capture of the dependent parameters permits later analysis of the performance of the pilot and the system, if desired.

Also provided are general purpose input/output (I/O) and analog to digital (A/D) boards 226. The I/O and A/D boards 226 are used to collect helicopter data that is not available from the helicopter's databus. The particular data collected by the I/O and A/D boards will depend on the particular aircraft (or simulator) that is being used, and provides a ready means for adapting a commercial system to other military or non-military aircraft or vehicles. The I/O and A/D boards 226 also provide a means for an experimenter or safety pilot to enter markers denoting significant events during a test flight. In the illustrated embodiment, the I/O and A/D boards 226 receive an input from the head tracker 222.

Also included in the ambient symbology display system 200 is a time stamp generator 228. The time stamp generator 228 is used to obtain Universal Time Codes. Universal Time Codes are typically recorded with every data frame, and are used to insure that data obtained from different sources is synchronized.

Depending on the particular location of the personal computer 210 in the helicopter, it may be necessary to provide video amplifier boards 230. In many cases, the computer 210 will be located remote from the pilot, and the resulting lengths of video cable required to reach from the computer 210 to the pilot 218 may be more than can be reliably driven by unamplified video boards.

Also, the system 200 is provided with fixed data storage means such as a hard drive 232 and removable storage means such as a Zip Drive 234. The hard drive 232 is used for software and data storage, and the Zip Drive 234 is used to store data for later analysis.

In operation, the ambient symbology display system 200 functions in a manner which is conceptually substantially identically to the ambient symbology display system 10 illustrated in FIG. 1, except that no central channel is displayed and the data collected is representative of the motion and attitude of a real helicopter as opposed to a simulated one.

In particular, in operation of the ambient symbology display system 200, the operator puts the HMD 212 on his or her head, the personal computer 210 is booted up, and the helicopter is started and flown in a conventional manner.

While the helicopter is being flown, the RealiMation graphics processing software obtains one or more parameters which are related to the motion of the helicopter in the environment (e.g. horizontal velocity, altitude, longitude and latitude distances) and one or more parameters which are related to the orientation of the object in the environment (e.g. yaw, pitch and roll). These motion and/or attitude parameter(s), are generated by the relevant navigation instrumentation and systems (e.g. an inertial navigation system or a global positioning system) and are captured from the helicopter databus by the RealiMation software through the MIL-STD-1553 board 224. Again, ambient symbology image data, which is representative of ambient symbology shown in FIG. 5, is processed by the RealiMation software in the personal computer, using the captured motion and orientation parameters and the drive laws, to provide motion of the ambient symbology. The processed image data is passed to the display surfaces 214 and 216, and the ambient symbology is displayed by the display means to the user. As discussed above, the orientation and motion of the ambient symbology is based on the motion parameters and the orientation parameters, and is presented outside the central 30 degrees of the field of view of a user.

Alternatively stated, the motion and attitude parameters are captured by the RealiMation software, the ambient symbology image data is processed using a least one of the parameters and a drive function, to generate updated image data based on the parameter(s). The updated image data is provided to the display surfaces 22, 24, to display the ambient symbology to the user; and the data capture, processing and display steps are executed repeated at a sufficiently high rate to provide motion of the ambient symbology.

It will be appreciated that many modifications can be made to the embodiments described above without departing from the spirit and the scope of the invention.

In particular, it should be noted that the ambient symbology display systems can be applied in a number of different real and virtual environments. Commercial applications for ambient symbology presentation are found in almost every instance involving visually guided control of air, water, land and space vehicles. Controllers of fixed and rotary wing aircraft, space vehicles, and remotely controlled air and ground vehicles, to name but a few, could benefit from this form of presenting motion and/or attitude information. Also, an ambient symbology display system could be used in air, ground and space vehicle training simulators to improve the efficiency of training by providing more salient control cues, and by reducing the cost of the training device. Computer or video games may be made more immersive for the player by incorporating ambient symbology displays therein.

Also, while the embodiments of the invention described above show the use of display means located on left and right sides of the operator/pilot's field of view, the display means could be configured to provide ambient symbology which is displayed in the upper and lower portions of the operator/pilot's field of view, with appropriate modifications to the drive laws to make the movement of the ambient symbology consistent with the movement of the real or virtual environment.

Further, while the display means discussed above comprises LCD panels or video monitors, it will be appreciated that any means which could display the ambient symbology in the desired part of the pilot/operator's field of view could be used. For example, direct retinal painting could be used.

It is also contemplated that dedicated processing means, as opposed to the general computer discussed above, will be appropriate for providing ambient symbology image generation and manipulation in specific applications.

It should also be noted that while the invention is directed to the presentation of ambient symbology in the peripheral field of view of the user, this does not preclude the presentation of ambient symbology in the central 30° of the user's field of view. In such a case, ambient symbology may be presented in the central 30° in conjunction with conventional focal symbology.

Further, with reference to the embodiment of the invention illustrated in FIG. 6, the data which is used to determine the movement of the ambient symbology may be varied. For example, the movement of the ambient symbology may be based on Forward Looking Infrared (FLIR) imagery or on Daylight Television (DTV) imagery. This might be useful in cases where the conventional input data is not sufficiently sensitive or is inconsistent. When using FLIR or DTV imagery to drive the movement of the ambient symbology, the salient ambient information derived from the FLIR or DTV imagery would be extended or extrapolated to provide the ambient symbology movement.

What is claimed is:

1. A method of presenting information on the motion or attitude of an object in an environment, to a user, by means of the motion of an image comprising ambient symbology, the method comprising the steps of:

providing an image display means for displaying an image to the user outside the central 30 degrees of the field of view of the user;

providing data processing means for manipulating image data;

providing ambient symbology image data, the ambient symbology image data being representative of an image including ambient symbology;

capturing a selected one of a motion parameter of the object and an orientation parameter of the object, the motion parameter being related to the motion of the object in the environment and the orientation parameter being related to the orientation of the object in the environment;

processing the ambient symbology image data in the processing means using the selected one of the motion parameter and the orientation parameter and a drive function, to provide motion of the image;

providing the ambient symbology image data to display means, such that a moving image including the ambient symbology is displayed by the display means outside the central 30 degrees of the field of view of the user, the motion of the image including the ambient symbology being based on the selected one of the motion parameter and the orientation parameter.

2. The method of claim 1 wherein the ambient symbology includes areas having at least one characteristic selected from the group consisting of differing contrast, differing color and differing texture, the areas not being representational of objects in the environment.

3. The method of claim 2 wherein the motion of the image including the ambient symbology is opposite in direction to the motion of the object in the environment.

4. The method of claim 3 wherein the motion parameter is selected from the group consisting of horizontal velocity and change in altitude, and wherein rearward motion of the image indicates forward motion of the object, downward movement of the image indicates an increase in altitude, and upward movement of the image indicates a decrease in altitude.

5. The method of claim 3 wherein the attitude parameter is selected from the group consisting of pitch, roll, and yaw, and wherein the movement of the image comprising the ambient symbology is selected from the group consisting of a) rotation of the image, and b) differential translation of the image in different areas of the field of view of the user.

6. The method of claim 5 wherein the display means provides left and right images in left and right areas of the field of view of the user, the attitude parameter is yaw, and the differential translation of the images comprises differential speeds of movement of the left and right images in a longitudinal direction of the object.

7. The method of claim 5 wherein the display means provides left and right images in left and right areas of the field of view of the user, the attitude parameter is pitch, and the movement of the images comprises rotation of the images about a pitch axis of the object.

8. The method of claim 5 wherein the display means provides left and right images in left and right areas of the field of view of the user, the attitude parameter is roll, and the differential translation of the images comprises differential speeds of movement of the left and right images in the direction of a yaw axis of the object.

9. The method of claim 3 wherein the display means is mounted to a head mounted display, the method further comprising the steps of:

tracking the orientation of the head mounted display using head tracking means;

providing a head position signal to the processing means; and wherein the step of processing the ambient symbology image data in the processing means comprises stabilizing of the movement of the image relative to the environment.

10. The method of claim 3 wherein the motion of the image including the ambient symbology is based on an absolute value of the selected parameter.

11. The method of claim 3 wherein the motion of the image including the ambient symbology is based on a relative value of the selected parameter.

12. The method of claim 3 wherein the motion of the image including the ambient symbology is based on a desired value of the selected parameter.

13. A method of presenting information on the motion or attitude of an object in an environment, to a user, by means of the motion of an image comprising ambient symbology, the method comprising the steps of:

a) providing image data which defines an image including ambient symbology;

b) obtaining a selected one of a motion parameter of the object and an orientation parameter of the object, the motion parameter being related to the motion of the object in the environment and the orientation parameter being related to the orientation of the object in the environment;

c) processing the image data using the selected one of the motion parameter and the orientation parameter and a drive function, thereby to generate updated image data based on the selected one of the parameters;

d) providing the updated image data to display means, such that an image comprising the ambient symbology is displayed by the display means outside the central 30 degrees of the field of view of the user; and e) executing steps b) to d) repeatedly, thereby to provide motion of the image comprising the ambient symbology, the motion being based on the selected one of the motion parameter and the orientation parameter.

14. The method of claim 13 wherein the ambient symbology includes areas having at least one characteristic selected from the group consisting of differing contrast, differing color and differing texture, the areas not being representational of objects in the environment.

15. The method of claim 14 wherein the motion of the image including the ambient symbology is opposite in direction to the motion of the object in the environment.

16. The method of claim 15 wherein the motion parameter is selected from the group consisting of horizontal velocity and change in altitude, and wherein rearward motion of the image indicates forward motion of the object, downward movement of the image indicates an increase in altitude, and upward movement of the image indicates a decrease in altitude.

17. The method of claim 15 wherein the attitude parameter is selected from the group consisting of pitch, roll, and yaw, and wherein the movement of the image comprising the ambient symbology is selected from the group consisting of a) rotation of the image, and b) differential translation of the image in different areas of the field of view of the user.

18. The method of claim 17 wherein the display means provides left and right images in left and right areas of the field of view of the user, the attitude parameter is yaw, and the differential translation of the images comprises differential speeds of movement of the left and right images in a longitudinal direction of the object.

19. The method of claim 17 wherein the display means provides left and right images in left and right areas of the field of view of the user, the attitude parameter is pitch, and the movement of the images comprises rotation of the images about a pitch axis of the object.

20. The method of claim 17 wherein the display means provides left and right images in left and right areas of the field of view of the user, the attitude parameter is roll, and the differential translation of the images comprises differential speeds of movement of the left and right images in the direction of a yaw axis of the object.

21. The method of claim 15 wherein the display means is mounted to a head mounted display, the method further comprising the steps of:

tracking the orientation of the head mounted display using head tracking means;

providing a head position signal to the processing means; and wherein the step of processing the ambient symbology image data in the processing means comprises stabilizing of the movement of the image relative to the environment.

22. The method of claim 15 wherein the motion of the image including the ambient symbology is based on an absolute value of the selected parameter.

23. The method of claim 15 wherein the motion of the image including the ambient symbology is based on a relative value of the selected parameter.

24. The method of claim 15 wherein the motion of the image including the ambient symbology is based on a desired value of the selected parameter.

25. Apparatus for presenting information on the motion or attitude of an object in an environment, to a user, by means of the motion of an image comprising ambient symbology, comprising:

means for obtaining a selected one of a motion parameter of the object and an orientation parameter of the object, the motion parameter being related to the motion of the object in the environment and the orientation parameter being related to the orientation of the object in the environment;

data processing means for manipulating ambient symbology image data, the ambient symbology image data being representative of an image including ambient symbology, the data processing means in use processing the ambient symbology image data using the selected one of the motion parameter and the orientation parameter and a drive function, to provide motion of the image; and     image display means for receiving the ambient symbology image data and for displaying an image to the user outside the central 30 degrees of the field of view of the user; the motion of the image in use being based on the selected one of the motion parameter and the orientation parameter.

26. The apparatus of claim 25 wherein the ambient symbology includes areas having at least one characteristic selected from the group consisting of differing contrast, differing color and differing texture, the areas not being representational of objects in the environment.

27. The apparatus of claim 26 wherein the motion of the image including the ambient symbology in use is opposite in direction to the motion of the object in the environment.

28. The apparatus of claim 27 wherein the motion parameter is selected from the group consisting of horizontal velocity and change in altitude, and wherein rearward motion of the image in use indicates forward motion of the object, downward movement of the image in use indicates an increase in altitude, and upward movement of the image indicates a decrease in altitude.

29. The apparatus of claim 27 wherein the attitude parameter is selected from the group consisting of pitch, roll, and yaw, and wherein the movement of the image comprising the ambient symbology is selected from the group consisting of a) rotation of the image, and b) differential translation of the image in different areas of the field of view of the user.

30. The apparatus of claim 29 wherein the display means in use provides left and right images in left and right areas of the field of view of the user, the attitude parameter is yaw, and the differential translation of the images comprises differential speeds of movement of the left and right images in a longitudinal direction of the object.

31. The apparatus of claim 29 wherein the display means in use provides left and right images in left and right areas of the field of view of the user, the attitude parameter is pitch, and the movement of the images comprises rotation of the images about a pitch axis of the object.

32. The apparatus of claim 29 wherein the display means in use provides left and right images in left and right areas of the field of view of the user, the attitude parameter is roll, and the differential translation of the images comprises differential speeds of movement of the left and right images in the direction of a yaw axis of the object.

33. The apparatus of claim 27 wherein the display means is mounted to a head mounted display, the apparatus further comprising:

head tracking means for tracking the orientation of the head mounted display and for providing a head position signal to the processing means; and wherein in use the processing means processes the ambient symbology image data to stabilize of the movement of the image relative to the environment.

34. The apparatus of claim 27 wherein in use the motion of the image including the ambient symbology is based on an absolute value of the selected parameter.

35. The apparatus of claim 27 wherein in use the motion of the image including the ambient symbology is based on a relative value of the selected parameter.

36. The apparatus of claim 27 wherein in use the motion of the image including the ambient symbology is based on a desired value of the selected parameter.

37. A program storage device readable by a machine, tangibly embodying a program of instructions executable by the machine to perform method steps for presenting information on the motion or attitude of an object in an environment, to a user, by means of motion of an image comprising ambient symbology, the machine including data processing means for manipulating image data and image display means for displaying an image to the user outside the central 30 degrees of the field of view of the user,     the method comprising the steps of:

capturing a selected one of a motion parameter of the object and an orientation parameter of the object, the motion parameter being related to the motion of the object in the environment and the orientation parameter being related to the orientation of the object in the environment;

processing ambient symbology image data in the processing means using the selected one of the motion parameter and the orientation parameter and a drive function, to provide motion of the image; and     providing the ambient symbology image data to display means, such that a moving image including ambient symbology is displayed by the display means outside the central 30 degrees of the field of view of the user, the motion of the image including the ambient symbology being based on the selected one of the motion parameter and the orientation parameter.

38. A program storage device according to claim 37 wherein, in execution of the method, the ambient symbology includes areas having at least one characteristic selected from the group consisting of differing contrast, differing color and differing texture, the areas not being representational of objects in the environment.

39. A program storage device according to claim 38 wherein, in execution of the method, the areas of the ambient symbology each subtend a minimum of 400 square minutes in the field of view of the user.

40. A computer program product comprising:

a computer usable medium having computer readable program code means for presenting information on the motion or attitude of an object in an environment, to a user, by means of motion of an image comprising ambient symbology, the computer readable program code means being executable by a computer including data processing means for manipulating image data and image display means for displaying an image to the user outside the central 30 degrees of the field of view of the user, the computer program product having:

computer readable program code means for capturing a selected one of a motion parameter of the object and an orientation parameter of the object, the motion parameter being related to the motion of the object in the environment and the orientation parameter being related to the orientation of the object in the environment;

computer readable program code means for processing ambient symbology image data in the processing means using the selected one of the motion parameter and the orientation parameter and a drive function, to provide motion of the image;

computer readable program code means for providing the ambient symbology image data to display means, such that a moving image including ambient symbology is displayed by the display means outside the central 30 degrees of the field of view of the user, the motion of the image including the ambient symbology being based on the selected one of the motion parameter and the orientation parameter.

41. A computer program product according to claim 40 wherein the ambient symbology includes areas having at least one characteristic selected from the group consisting of differing contrast, differing color and differing texture, the areas not being representational of objects in the environment.

42. A computer program product according to claim 41 wherein, in execution of the method, the areas of the ambient symbology each subtend a minimum of 400 square minutes in the field of view of the user.

* * * * *